(12) United States Patent
Wang et al.

(10) Patent No.: US 8,594,907 B2
(45) Date of Patent: Nov. 26, 2013

(54) ROBUST ESTIMATION OF BIODIESEL BLEND RATIO FOR ALTERNATIVE FUEL COMBUSTION

(75) Inventors: Yue-Yun Wang, Troy, MI (US); Ibrahim Haskara, Macomb, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 260 days.

(21) Appl. No.: 13/113,177

(22) Filed: May 23, 2011

(65) Prior Publication Data
US 2012/0303245 A1    Nov. 29, 2012

(51) Int. Cl.
 *B60T 7/12* (2006.01)
 *G05D 1/00* (2006.01)
 *G06F 17/00* (2006.01)
 *G06F 19/00* (2011.01)

(52) U.S. Cl.
USPC ............ 701/104; 123/575; 123/304; 123/1 A; 123/672; 701/102

(58) Field of Classification Search
USPC ............ 123/575–578, 299, 300, 304, 27 GE, 123/1 A, 435, 672, 674, 675, 703, 704; 701/102–104, 109
See application file for complete search history.

(56) References Cited

U.S. PATENT DOCUMENTS

| | | | | |
|---|---|---|---|---|
| 5,229,946 A | * | 7/1993 | Ghaem | 701/106 |
| 5,513,609 A | * | 5/1996 | Hirose et al. | 123/339.14 |
| 6,981,472 B2 | * | 1/2006 | Bromberg et al. | 123/3 |
| 7,266,439 B2 | * | 9/2007 | Wang et al. | 701/106 |
| 7,426,925 B2 | * | 9/2008 | Leone et al. | 123/575 |
| 8,229,648 B2 | * | 7/2012 | Kang et al. | 701/103 |
| 2007/0124055 A1 | * | 5/2007 | Kang et al. | 701/108 |
| 2008/0072878 A1 | * | 3/2008 | Kokubu | 123/486 |
| 2008/0072881 A1 | * | 3/2008 | Leone et al. | 123/516 |
| 2008/0140297 A1 | * | 6/2008 | Neunteufl et al. | 701/103 |
| 2008/0312806 A1 | * | 12/2008 | Ueda | 701/103 |
| 2009/0216424 A1 | * | 8/2009 | Kolnes | 701/103 |
| 2009/0306875 A1 | * | 12/2009 | Jiang et al. | 701/102 |
| 2010/0024771 A1 | * | 2/2010 | Bidner et al. | 123/446 |
| 2010/0211290 A1 | * | 8/2010 | Kidokoro et al. | 701/103 |

OTHER PUBLICATIONS

U.S. Appl. No. 12/850,112, Haskara et al.
U.S. Appl. No. 13/114,004, Wang et al.
U.S. Appl. No. 12/720,815, Wang et al.

* cited by examiner

*Primary Examiner* — Stephen K Cronin
*Assistant Examiner* — Joseph Dallo

(57) ABSTRACT

A method to control an internal combustion engine includes operating the engine with a fuel blend of a first fuel and a second fuel, monitoring a value of a first combustion parameter during engine operation, monitoring a first value for a second combustion parameter during engine operation, determining a second value for the second combustion parameter in accordance with a predetermined correspondence among the first combustion parameter, the second combustion parameter, and a predetermined fuel blend of the first fuel and the second fuel, determining the fuel blend based upon a difference between the first and second values for the second combustion parameter, and controlling the engine based upon the fuel blend.

20 Claims, 7 Drawing Sheets

ROBUST ESTIMATION OF BIODIESEL BLEND RATIO FOR ALTERNATIVE FUEL COMBUSTION

TECHNICAL FIELD

This disclosure is related to control of an engine utilizing biodiesel fuel.

BACKGROUND

The statements in this section merely provide background information related to the present disclosure. Accordingly, such statements are not intended to constitute an admission of prior art.

Diesel engines can operate on a 100% diesel supply of fuel. Additionally, diesel engines can be configured to operate partially or fully on a biodiesel supply of fuel. A biodiesel blend ratio can be identified. B0 fuel is identified as a 100% diesel supply of fuel. B100 fuel is identified as 100% biodiesel supply of fuel. Bx fuel can be identified with x % biodiesel composition and (100%-x %) diesel composition. For example, B40 fuel is a 40% biodiesel and 60% diesel composition.

Diesel fuel and biodiesel fuel include different properties. Diesel fuel has a higher energy density than biodiesel fuel. As a result, in order to achieve a substantially identical result in combustion, a greater mass of biodiesel needs to be injected than would be required of diesel under the same circumstances. Use of fuel in combustion can be adjusted based upon the biodiesel blend ratio.

SUMMARY

A method to control an internal combustion engine includes operating the engine with a fuel blend of a first fuel and a second fuel, monitoring a value of a first combustion parameter during engine operation, monitoring a first value for a second combustion parameter during engine operation, determining a second value for the second combustion parameter in accordance with a predetermined correspondence among the first combustion parameter, the second combustion parameter, and a predetermined fuel blend of the first fuel and the second fuel, determining the fuel blend based upon a difference between the first and second values for the second combustion parameter, and controlling the engine based upon the fuel blend.

BRIEF DESCRIPTION OF THE DRAWINGS

One or more embodiments will now be described, by way of example, with reference to the accompanying drawings, in which.

DETAILED DESCRIPTION

Figure 1:
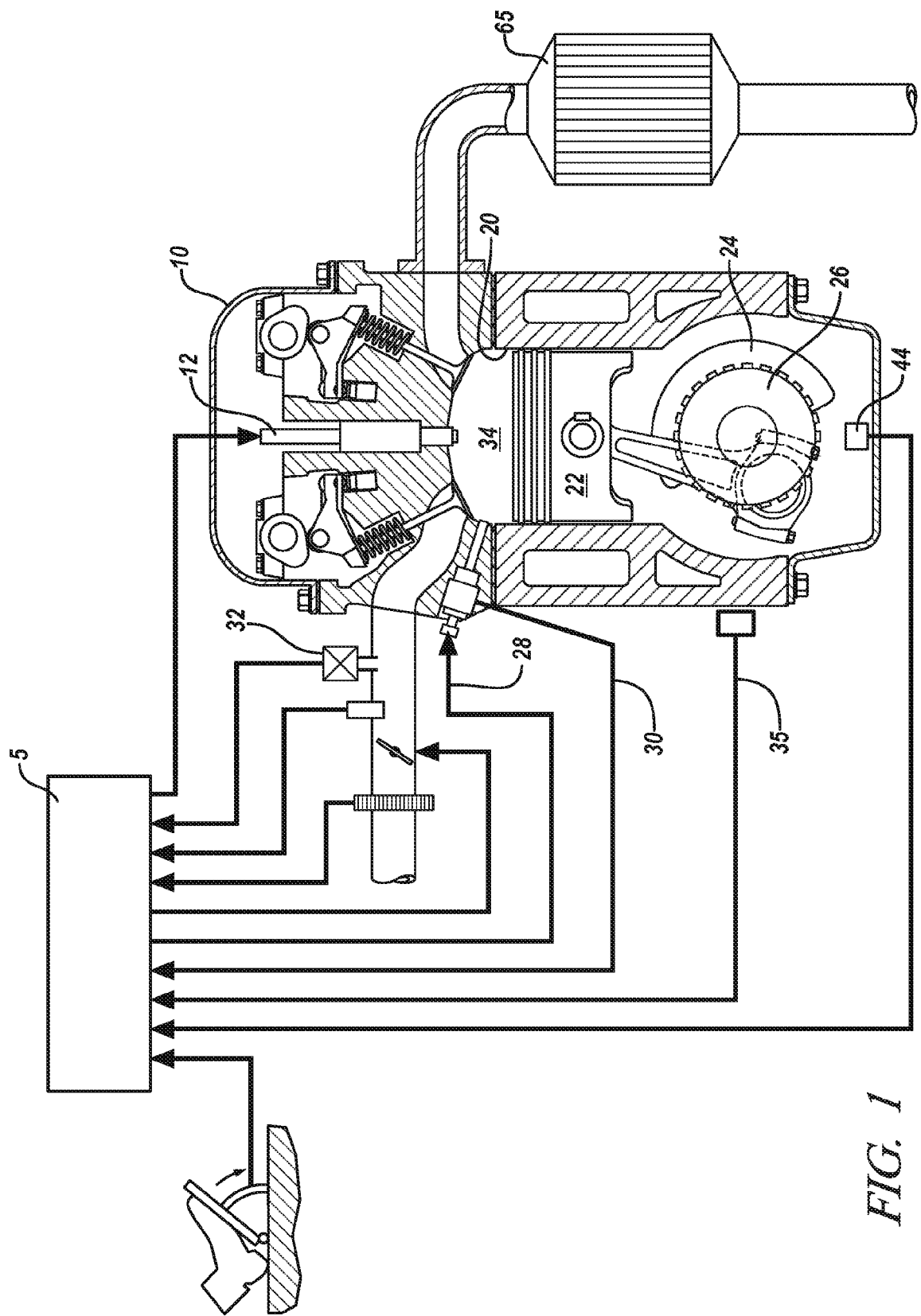
FIG. 1 illustrates an exemplary internal combustion engine, control module, and exhaust aftertreatment system, in accordance with the present disclosure.

Referring now to the drawings, wherein the showings are for the purpose of illustrating certain exemplary embodiments only and not for the purpose of limiting the same, FIG. 1 illustrates an exemplary internal combustion engine 10, control module 5, and exhaust aftertreatment system 65. The exemplary engine includes a multi-cylinder, direct-injection, compression-ignition internal combustion engine having reciprocating pistons 22 attached to a crankshaft 24 and movable in cylinders 20 which define variable volume combustion chambers 34. The crankshaft 24 is operably attached to a vehicle transmission and driveline to deliver tractive torque thereto, in response to an operator torque request, $T_{O\_REQ}$. The engine preferably employs a four-stroke operation wherein each engine combustion cycle includes 720 degrees of angular rotation of crankshaft 24 divided into four 180-degree stages (intake-compression-expansion-exhaust), which are descriptive of reciprocating movement of the piston 22 in the engine cylinder 20. A multi-tooth target wheel 26 is attached to the crankshaft and rotates therewith. The engine includes sensors to monitor engine operation, and actuators which control engine operation. The sensors and actuators are signally or operatively connected to control module 5.

The engine is preferably a direct-injection, four-stroke, internal combustion engine including a variable volume combustion chamber defined by the piston reciprocating within the cylinder between top-dead-center and bottom-dead-center points and a cylinder head including an intake valve and an exhaust valve. The piston reciprocates in repetitive cycles each cycle including intake, compression, expansion, and exhaust strokes.

The engine preferably has an air/fuel operating regime that is primarily lean of stoichiometry. One having ordinary skill in the art understands that aspects of the disclosure are applicable to other engine configurations that operate primarily lean of stoichiometry, e.g., lean-burn spark-ignition engines. During normal operation of the compression-ignition engine, a combustion event occurs during each engine cycle when a fuel charge is injected into the combustion chamber to form, with the intake air, the cylinder charge.

The engine is adapted to operate over a broad range of temperatures, cylinder charge (air, fuel, and EGR) and injection events. The methods described herein are particularly suited to operation with direct-injection compression-ignition engines operating lean of stoichiometry to determine parameters which correlate to heat release in each of the combustion chambers during ongoing operation. The methods are further applicable to other engine configurations, including spark-ignition engines, including those adapted to use homogeneous charge compression ignition (HCCI) strategies. The methods are applicable to systems utilizing multi-pulse fuel injection events per cylinder per engine cycle, e.g., a system employing a pilot injection for fuel reforming, a main injection event for engine power, and, where applicable, a post-combustion fuel injection event for aftertreatment management, each which affects cylinder pressure.

Sensors are installed on or near the engine to monitor physical characteristics and generate signals which are correlatable to engine and ambient parameters. The sensors include a crankshaft rotation sensor, including a crank sensor 44 for monitoring crankshaft (i.e. engine) speed (RPM) through sensing edges on the teeth of the multi-tooth target wheel 26. The crank sensor is known, and may include, e.g., a Hall-effect sensor, an inductive sensor, or a magnetoresistive sensor. Signal output from the crank sensor 44 is input to the control module 5. A combustion pressure sensor is adapted to monitor and provide signal 30 for in-cylinder pressure (COMB_PR). The combustion pressure sensor is preferably non-intrusive and includes a force transducer having an annular cross-section that is adapted to be installed into the cylinder head at an opening for a glow-plug which is provided a controlled a glow-plug current 28. The output signal 30, COMB_PR, of the pressure sensor is proportional to cylinder pressure. The pressure sensor includes a piezoceramic or other device adaptable as such. Other sensors preferably include a manifold pressure sensor for monitoring manifold pressure (MAP) and ambient barometric pressure (BARO), a mass air flow sensor for monitoring intake mass air flow (MAF) and intake air temperature ($T_{IN}$), and a coolant sensor monitoring and providing signal 35 for engine coolant temperature (COOLANT). The system may include an exhaust gas sensor for monitoring states of one or more exhaust gas parameters, e.g., temperature, air/fuel ratio, and constituents. One skilled in the art understands that there may other sensors and methods for purposes of control and diagnostics. The operator input, in the form of the operator torque request, $T_{O\_REQ}$, is typically obtained through a throttle pedal and a brake pedal, among other devices. The engine is preferably equipped with other sensors for monitoring operation and for purposes of system control. Each of the sensors is signally connected to the control module 5 to provide signal information which is transformed by the control module to information representative of the respective monitored parameter. It is understood that this configuration is illustrative, not restrictive, including the various sensors being replaceable with functionally equivalent devices and algorithms.

The actuators are installed on the engine and controlled by the control module 5 in response to operator inputs to achieve various performance goals. Actuators include an electronically-controlled throttle valve which controls throttle opening in response to a control signal (ETC), and a plurality of fuel injectors 12 for directly injecting fuel into each of the combustion chambers in response to a control signal (INJ_PW), all of which are controlled in response to the operator torque request, $T_{O\_REQ}$. An exhaust gas recirculation (EGR) valve 32 and cooler control flow of externally recirculated exhaust gas to the engine intake, in response to a control signal from the control module. A glow-plug is installed in each of the combustion chambers and adapted for use with the combustion pressure sensor. Additionally, a charging system can be employed in some embodiments supplying boost air according to a desired manifold air pressure.

Fuel injector 12 is a high-pressure fuel injector adapted to directly inject a fuel charge into one of the combustion chambers in response to the command signal, INJ_PW, from the control module. Each of the fuel injectors 12 is supplied pressurized fuel from a fuel distribution system, and have operating characteristics including a minimum pulsewidth and an associated minimum controllable fuel flow rate, and a maximum fuel flow rate.

The engine may be equipped with a controllable valvetrain operative to adjust openings and closings of intake and exhaust valves of each of the cylinders, including any one or more of valve timing, phasing (i.e., timing relative to crank angle and piston position), and magnitude of lift of valve openings. One exemplary system includes variable cam phasing, which is applicable to compression-ignition engines, spark-ignition engines, and homogeneous-charge compression ignition engines.

The control module 5 executes routines stored therein to control the aforementioned actuators to control engine operation, including throttle position, fuel injection mass and timing, EGR valve position to control flow of recirculated exhaust gases, glow-plug operation, and control of intake and/or exhaust valve timing, phasing, and lift on systems so equipped. The control module is configured to receive input signals from the operator (e.g., a throttle pedal position and a brake pedal position) to determine the operator torque request, $T_{O\_REQ}$, and from the sensors indicating the engine speed (RPM) and intake air temperature (Tin), and coolant temperature and other ambient conditions.

Control module, module, control, controller, control unit, processor and similar terms mean any suitable one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other suitable components to provide the described functionality. Software, firmware, programs, instructions, routines, code, algorithms and similar terms mean any controller executable instruction sets including calibrations and look-up tables. The control module has a set of control routines executed to provide the desired functions. The routines are preferably executed during preset loop cycles. Routines are executed, such as by a central processing unit, and are operable to monitor inputs from sensing devices and other networked control modules, and execute control and diagnostic routines to control operation of actuators. Loop cycles may be executed at regular intervals, for example each 3.125, 6.25, 12.5, 25 and 100 milliseconds during ongoing engine and vehicle operation. Alternatively, routines may be executed in response to occurrence of an event.

FIG. 1 illustrates an exemplary diesel engine, however, the present disclosure can similarly be utilized on other engine configurations, for example, including gasoline-fueled engines, ethanol or E85 fueled engines, or other similar known designs. The disclosure is not intended to be limited to the particular exemplary embodiments described herein.

Combustion within an engine fueled by diesel fuel has certain predictable properties. Under proper conditions, an input tracking one property of combustion will provide a correlated output of another property. Similarly, combustion within an engine fueled by biodiesel fuel has certain predictable properties, and under proper conditions, an input tracking one property of combustion will provide a correlated output of another property. Combustion within an engine fueled by fuel composed with some portion of diesel fuel and some portion of biodiesel fuel has similar predictable properties. Because combustion of diesel fuel and combustion of biodiesel fuel have different properties, comparing the monitored properties can provide an estimate of how much biodiesel fuel is present in the fuel being utilized by the engine. By operating an engine and monitoring the operating properties of the engine, a biodiesel blend ratio for the fuel being utilized by the engine can be estimated or determined According to one exemplary correlation of combustion properties, at steady state, an exhaust oxygen fraction to air fuel ratio relationship for a particular fuel can be expressed. An engine utilizing a blend of diesel and biodiesel fuel is disclosed in co-pending and commonly assigned U.S. Ser. No. 12/850, 112, which is incorporated herein by reference. While diesel and biodiesel fuels and blends thereof are discussed in detail, the present disclosure is equally applicable to any fuel blend of first and second fuels (e.g. gasoline and ethanol blends).

Figure 2:
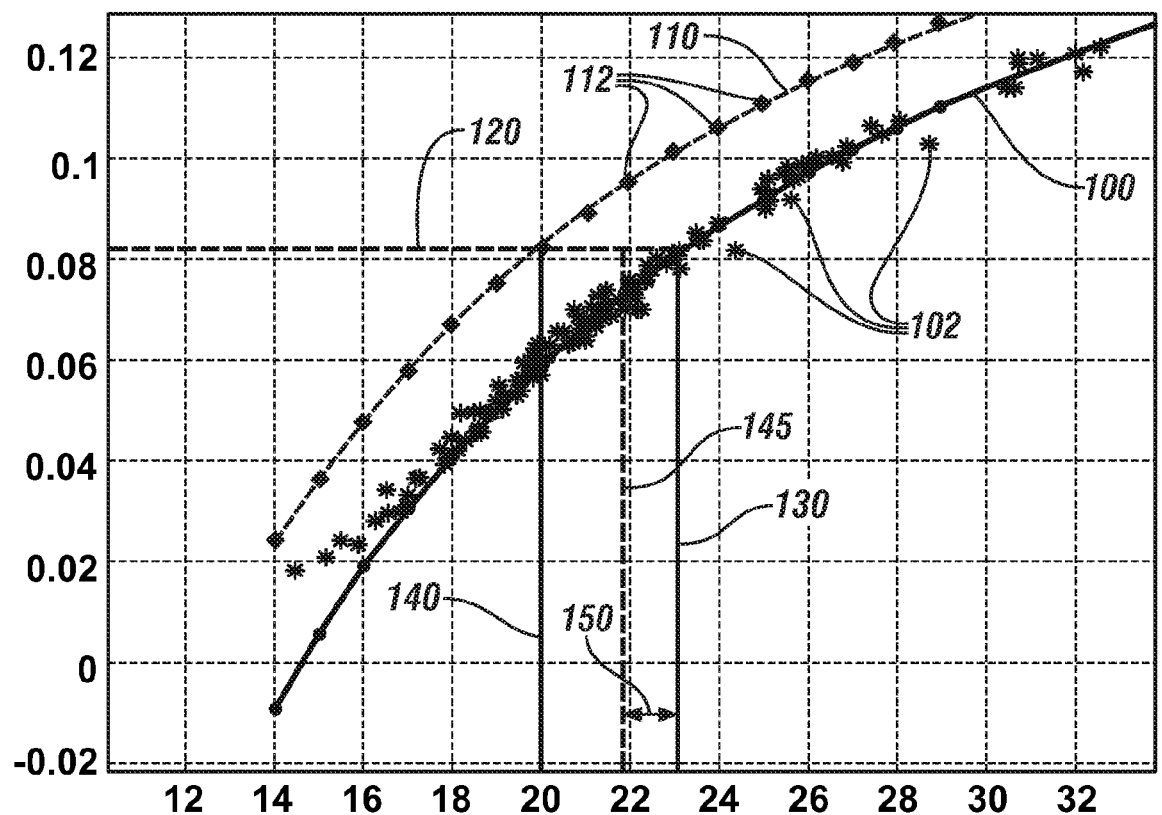
FIG. 2 illustrates an exhaust oxygen fraction to air fuel ratio relationship through a range of values for B0 fuel and B100 fuel, in accordance with the present disclosure.

FIG. 2 illustrates an exhaust oxygen fraction to air fuel ratio relationship through a range of values for B0 fuel and B100 fuel. A horizontal x-axis illustrates an air fuel ratio. A vertical y-axis illustrates an exhaust oxygen fraction. Plot 100 illustrates combustion properties of B0 fuel. Plot 100 can be generated by selecting a best fit of experimental points 102 monitored during testing of an exemplary engine configuration. Plot 110 illustrates combustion properties of B100 fuel. Plot 110 can be generated by selecting a best fit of experimental points 112 monitored during testing of an exemplary engine configuration. Similar plots could be illustrated for other fuels or for other blend ratios of any given two fuels. Testing has shown that many combustion properties for Bx fuel vary approximately linearly between B0 and B100. As a result, experimental points for B50 fuel would create a plot for B50 fuel midway between the illustrated plots 100 and 110. Experimental points for B25 fuel would create a plot for B25 fuel located midway between a plot for B50 fuel and plot 100. For a given monitored value 120 of exhaust oxygen fraction, a corresponding value of the air fuel ratio for B0 fuel (i.e. a fuel blend of 0% biodiesel fuel and 100% diesel fuel) 130 can be determined In similar fashion, a given monitored value 120 of exhaust oxygen fraction can be used to determine a corresponding value 140 of the air fuel ratio for B100 fuel (i.e. a fuel blend of 100% biodiesel fuel and 0% diesel fuel). In fact, a given monitored value 120 of exhaust oxygen fraction can be used to determine a corresponding value of the air fuel ratio for any blend of the diesel and biodiesel fuels. Such a determination may be referred to as being in relation to a predetermined fuel blend. Preferably, however, the determination is made relative to B0 (i.e. a fuel blend of 0% biodiesel fuel and 100% diesel fuel). Further, based upon a monitored or estimated actual air fuel ratio value 145, a comparison to the value of the air fuel ratio for B0 fuel 130 (or other predetermined fuel blend) can be used to estimate the biodiesel blend ratio of the fuel being utilized by the engine. According to one embodiment, a discrepancy 150 can be determined and used to estimate the biodiesel blend ratio.

The comparison of FIG. 2 can be reduced to computational expressions. The following relationship has been shown:

$$\frac{1+AFR_{est}}{1+AFR} \cong \frac{AFR_{stRD}}{AFR_{stBD}} \quad [1]$$

wherein $AFR_{stRD}$ is an air fuel ratio for an exemplary engine utilizing solely diesel fuel or B0 fuel at stoichiometry.

$AFR_{stBD}$ is an air fuel ratio for a current fuel composition being utilized by the engine at stoichiometry.

$AFR_{est}$ is a value for the air fuel ratio for the engine operating solely on diesel fuel corresponding to a current $O_2$ value, determinable for example according to the relationship illustrated in FIG. 2.

AFR is an air fuel ratio monitored or estimated, for example, based upon a MAF sensor reading and a fuel flow rate.

$AFR_{stRD}$ is a known, constant value. Given Bx for fuel being utilized by the engine, $AFR_{stBD}$ is a knowable value. Similarly, if one solves for or determines $AFR_{stBD}$, the biodiesel blend ratio can be determined based upon an exhaust oxygen fraction to air fuel ratio relationship as illustrated in FIG. 2. As disclosed in relation to FIG. 2, at steady state conditions, according to a known exhaust oxygen fraction to air fuel ratio relationship, given a known exhaust oxygen fraction value, a value of the air fuel ratio for B0 fuel or $AFR_{est}$ is determinable. The fuel flow rate can be determined based upon control system commands. A reading from the exhaust oxygen fraction sensor, $O_2$, monitoring an exhaust oxygen fraction for a known fuel can be used to estimate an air fuel ratio for the fuel, for example, for B0 fuel as set forth below.

$$O_2 = 0.23\left(1 - \frac{1+AFR_{stRD}}{1+AFR_{est}}\right) \quad [2]$$

$O_2$ can be monitored, for example, through a universal exhaust gas oxygen (UEGO) sensor or wide range air fuel sensor (WRAF) located in the exhaust system. Based upon known values for $AFR_{stRD}$ and $O_2$, $AFR_{est}$ can be determined to provide a current or actual air fuel ratio for the engine based upon an assumption that the engine is operating on B0 fuel. Similarly, for Bx fuel, the following expression $$O_2 = 0.23\left(1 - \frac{1+AFR_{stBD}}{1+AFR}\right) \quad [3]$$

can provide AFR for a fuel currently being utilized by the engine with a fuel composition Bx.

Combining Equations 2 and 3, based upon a single $O_2$ measurement, the resulting following expression $$\left(1 - \frac{1+AFR_{stRD}}{1+AFR_{est}}\right) = \left(1 - \frac{1+AFR_{stBD}}{1+AFR}\right) \quad [4]$$

can be simplified as follows.

$$\frac{1+AFR_{est}}{1+AFR} = \frac{1+AFR_{stRD}}{1+AFR_{stBD}} \quad [5]$$

Eq. 2 can be utilized to illustrate an air fuel ratio to exhaust oxygen fraction relationship for B0 fuel. $AFR_{est}$ can be expressed as follows.

$$AFR_{est} = f_{B0}(O_2) \quad [6]$$

If the values of AFR and $AFR_{est}$ are determined, Eq. 5 can be solved for $AFR_{stBD}$, which can then be used to determine the biodiesel blend ratio. In this way, a comparison of AFR and $AFR_{est}$ in the context of $AFR_{stBD}$ and $AFR_{stRD}$ yields a determination of the biodiesel blend ratio provided by discrepancy 150 in FIG. 2, in computational form.

For a Bx fuel, AFR corresponding to an $O_2$ reading will be less than $AFR_{est}$ corresponding to the same $O_2$ reading. This disparity between AFR and $AFR_{est}$ can be used to quantify the biodiesel content of the fuel or the biodiesel blend ratio of the fuel. According to one embodiment, the following comparison can be utilized.

$$AFR_{est} - AFR > \text{Threshold} \quad [7]$$

If the disparity between AFR and $AFR_{est}$ is greater than a calibrated threshold, then a substantial portion of the fuel being utilized by the engine can be indicated to be biodiesel. Such an indication can be used to determine whether sufficient biodiesel is present to alter control of the engine based upon the fuel content. In one embodiment, a plurality of thresholds can be selected, and various stages of control can be implemented based upon which thresholds are passed.

An exhaust oxygen fraction to air fuel ratio relationship can be stored for use by a control module according to a number of methods known in the art. For example, based upon either $O_2$ or AFR as an input, the corresponding value can be returned as a look-up value on a table or array, be returned as an output of a functional relationship such as one or more equations representing the correspondence between exhaust oxygen fraction and air fuel ratio (i.e. solving a predetermined equation), or any other technique. One having ordinary skill in the art understands that various curve fitting techniques may be utilized to yield one or more equations representing the relationship between exhaust oxygen fraction and air fuel ratio.

According to the present disclosure, AFR and $AFR_{est}$ can be used to estimate and provide control based upon the biodiesel blend ratio. However, during operation of the engine, AFR and $AFR_{est}$ can include significant variability. According to one embodiment, state space modeling and a Kalman filter can be utilized to estimate a biodiesel blend ratio for fuel being utilized by an engine based upon AFR and $AFR_{est}$ values, removing variability and producing a stable value useful for control. State space modeling and Kalman filters are well known in the art and will not be described in detail herein. A gamma ratio can be defined as follows.

$$r(t) = \frac{(1 + AFR_{est})}{(1 + AFR)} \quad [8]$$

Where $AFR_{stBD}$ is an unknown value to be estimated, a state space model can be defined by the following:

$$x_{k+1} = F_k x_k + w_k, \; x_0 = 1 \quad [9]$$

$$y_k = H_k x_k + v_k, \quad [10]$$

$$y_k = r(t) = \frac{1 + f_{B0}(O_2)}{1 + AFR}, \; F_k = 1, \; H_k = 1 \quad [11]$$

-continued $$x_k = \frac{AFR_{stRD}}{AFR_{stBD}} \quad [12]$$

wherein $v_k$ and $w_k$ are white noises, and wherein a ratio between $v_k$ and $w_k$ define a time constant for the Kalman filter. The Kalman filter can be applied through the following equations.

$$\hat{x}_{k|k-1} = F_k \hat{x}_{k-1|k-1} + w_{k-1} \quad [13]$$

$$\tilde{y}_k = y_k - H_k \hat{x}_{k|k-1} \quad [14]$$

$$\hat{x}_{k|k} = \hat{x}_{k|k-1} - K_k \tilde{y}_k \quad [15]$$

$\hat{x}_{k|k}$ provides an estimate of $AFR_{stRD}/AFR_{stBD}$. Predicted estimate covariance can be defined by the following equations:

$$P_{k|k-1} = F_k P_{k-1|k-1} F_k^T + Q_{k-1} \quad [16]$$

$$K_k = -P_{k|k-1} H_k^T (H_k P_{k|k-1} H_k^T + R_k)^{-1} \quad [17]$$

wherein
K is a Kalman filter gain;
Q is a covariance of process noise w, and
R is a covariance of measurement noise v.

One having skill in the art will appreciate that other filters can be used in the alternative to the Kalman filter.

If a value of $AFR_{stBD}$ can be quantified by a state space model and Kalman filter or by other method, and behavior of the air fuel ratio between $AFR_{stRD}$ and $AFR_{stB100}$, the air fuel ratio for B100 fuel at stoichiometry and a known value, is approximately linear, then the biodiesel blend ratio can be determined by interpolating a percentage from the relationship of $AFR_{stBD}$ to $AFR_{stRD}$ and $AFR_{B100}$. The biodiesel blend ratio (BD) can, therefore, be determined as follows.

$$BD = \frac{\frac{AFR_{stBD}}{AFR_{stRD}} - 1}{\frac{AFR_{stB100}}{AFR_{stRD}} - 1} \cdot 100\% \quad [18]$$

Figure 3:
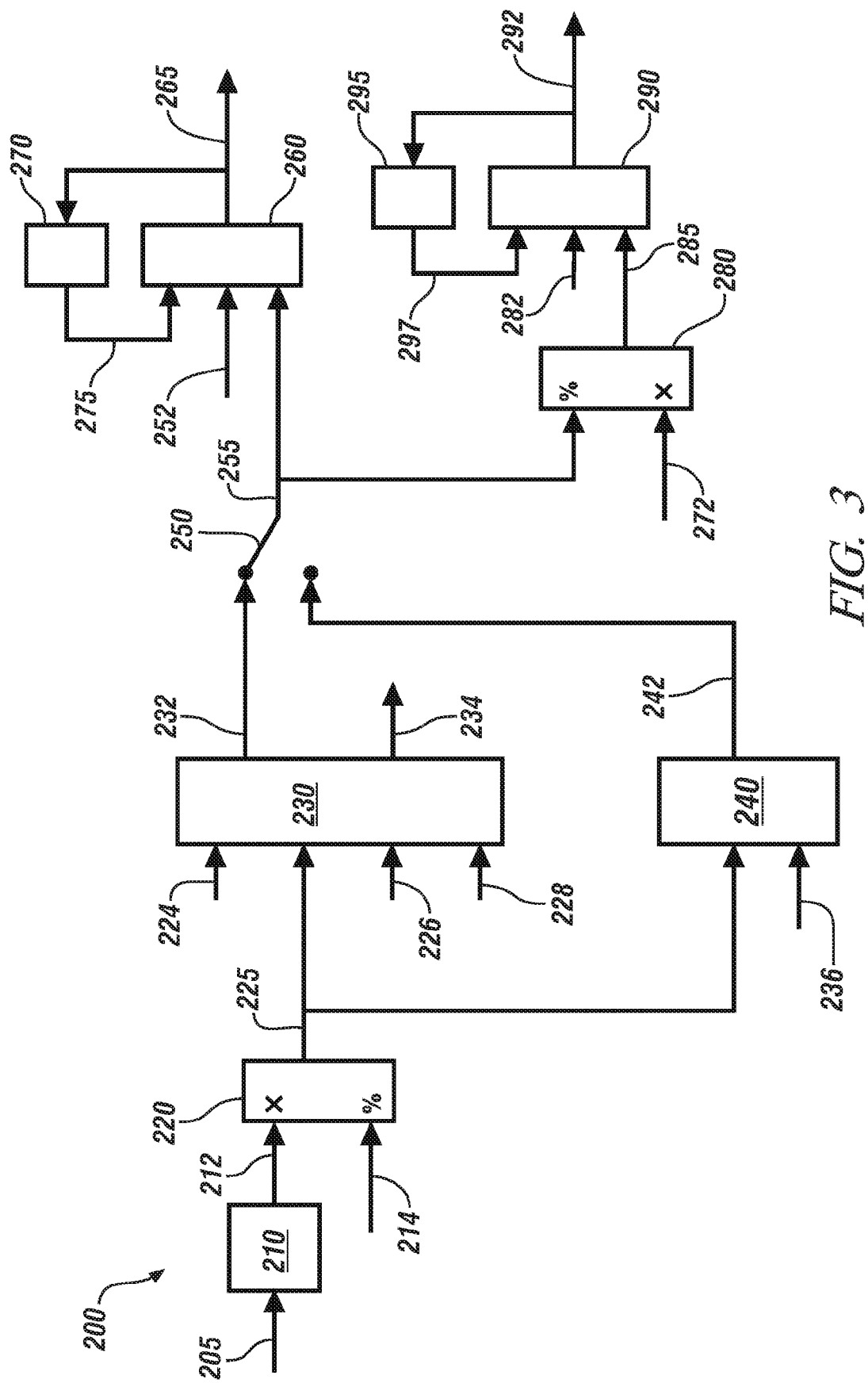
FIG. 3 illustrates an exemplary information flow to utilize state space modeling and a Kalman filter to estimate a biodiesel blend ratio for fuel being utilized by an engine, in accordance with the present disclosure.

FIG. 3 illustrates an exemplary information flow to utilize state space modeling and a Kalman filter to estimate a biodiesel blend ratio for fuel being utilized by an engine based upon AFR and $AFR_{est}$. Information flow 200 begins with combustion property module 210 which monitors an actual or measured exhaust oxygen fraction signal 205 and determines $AFR_{est}$ 212. Combustion property module 210 may include, for example, a look-up table, equation, or combination thereof representing the correlation between exhaust oxygen fraction and air fuel ratio. Gamma ratio module 220 monitors $AFR_{est}$ 212 and an actual or estimated AFR value 214, and outputs gamma ratio r(t) 225. AFR value 214 can include a minimum value limit. Information flow 200 can use a single filter or a plurality of filters. Information flow 200 includes Kalman filter 230 and linear filter 240. Switch 250 selects between the outputs of Kalman filter 230 and linear filter 240 based upon calibrated selection criteria based upon strengths and weaknesses of the respective filters. Kalman filter 230 monitors r(t) 225, noise term $Q_{k-1}$ 224, value $H_k$ 226 (including an exemplary value of one), and noise term $R_k$ 228. Noise terms 224 and 228 can be fixed values. In one embodiment, each of the filters can include a plurality of selectable values that can be switched between, providing selectable wide band and narrow band filtering based upon desired operation of the filter. Such selection can enable rapid adjustment of the filter to a changed value, and subsequent switching to a slower but more stable response. Filter value calibration and filter behavior are known in the art and will not be discussed in detail herein. Exemplary values of $Q_{k-1}$ include 0.1 and 0.01, and exemplary values of $R_k$ include 500 and one. Kalman filter 230 determines and outputs $\hat{x}_{k|k}$ value 232 and predicted estimated covariance value 234. Linear filter 240 monitors r(t) 225 and linear filter constant 236 (including an exemplary value of 0.99) and determines and outputs estimate $AFR_{stRD}/AFR_{stBD}$ 242. Switch 250 selects between $\hat{x}_{k|k}$ value 232 and estimate $AFR_{stRD}/AFR_{stBD}$ 242 to create signal 255. Output module 260 monitors signal 255, timing signal 252 (generating an exemplary timing of 5 seconds, a calibration value), and iterative signal 275 to determine $AFR_{stRD}/AFR$ output signal 265. Iterative signal 275 is generated by iteration block 270 monitoring a previous value of $AFR_{stRD}/AFR$ output signal 265. Module 280 monitors signal 255 and $AFR_{stRD}$ value 272 and determines signal 285. Output module 290 monitors signal 285, timing signal 282 (generating an exemplary timing of 5 seconds, a calibration value) which may but need not be the same timing signal as timing signal 252, and iterative signal 297 to determine $AFR_{stBD}$ signal 292. Iterative signal 297 is generated by iteration block 295 monitoring a previous value of $AFR_{stBD}$ output signal 292. Output modules 260 and 290 can include mechanisms to lock in values of their respective outputs when criteria are met that the respective output value represents a stable and accurate estimate. Information flow 200 illustrates one exemplary configuration, however the disclosure is not intended to be limited to the particular exemplary embodiments provided herein.

A biodiesel blend ratio can be estimated for fuel being utilized by the engine based upon comparing an actual air fuel ratio value and an air fuel ratio for B0 fuel. Another method to estimate a biodiesel blend ratio for fuel being utilized by an engine includes monitoring an air fuel ratio value and estimating a corresponding value of the exhaust oxygen fraction for B0 fuel. Based upon a monitored value of an actual exhaust oxygen fraction, a comparison to the estimated exhaust oxygen fraction for B0 fuel can be used to estimate the biodiesel blend ratio of the fuel being utilized by the engine.

Figure 4:
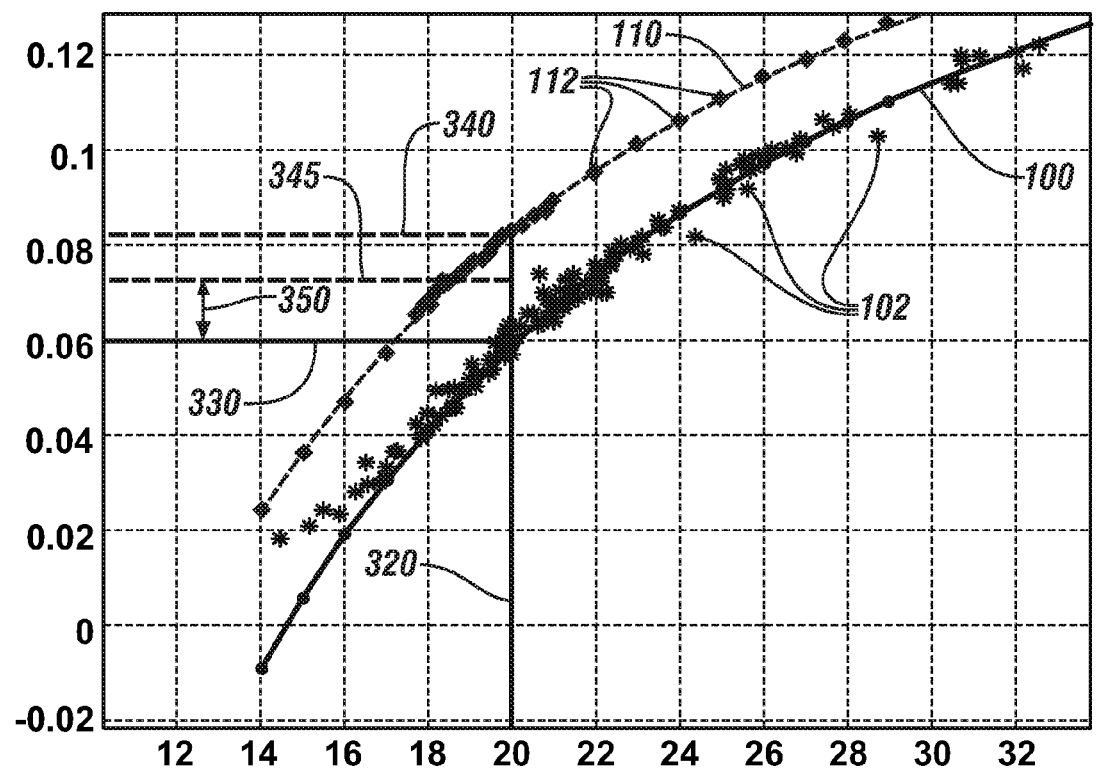
FIG. 4 illustrates an exhaust oxygen fraction to air fuel ratio relationship through a range of values for B0 fuel and B100 fuel, in accordance with the present disclosure.

FIG. 4 illustrates an exhaust oxygen fraction to air fuel ratio relationship through a range of values for B0 fuel and B100 fuel. A horizontal x-axis illustrates an air fuel ratio. A vertical y-axis illustrates an exhaust oxygen fraction. Plot 100 illustrates combustion properties of B0 fuel. Plot 100 can be generated by selecting a best fit of experimental points 102 monitored during testing of an exemplary engine configuration. Plot 110 illustrates combustion properties of B100 fuel. Plot 110 can be generated by selecting a best fit of experimental points 112 monitored during testing of an exemplary engine configuration. For a given monitored value 320 of air fuel ratio, a corresponding value of the exhaust oxygen fraction for B0 fuel (i.e. a fuel blend of 100% biodiesel fuel and 0% diesel fuel) 330 can be determined In similar fashion, a given monitored value 320 of air fuel ratio can be used to determine a corresponding value 340 of the exhaust oxygen fraction for B100 fuel (i.e. a fuel blend of 100% biodiesel fuel and 0% diesel fuel). In fact, a given monitored value 320 of air fuel ratio can be used to determine a corresponding value of the exhaust oxygen fraction for any blend of the diesel and biodiesel fuels. Such a determination may be referred to as being in relation to a predetermined fuel blend. Preferably, however, the determination is made relative to B0 (i.e. a fuel blend of 0% biodiesel fuel and 100% diesel fuel). Further, based upon a monitored or estimated actual exhaust oxygen fraction value 345, a comparison to the exhaust oxygen fraction for B0 fuel 330 (or other predetermined fuel blend) can be used to estimate the biodiesel blend ratio of the fuel being utilized by the engine. According to one embodiment, a discrepancy 350 can be determined and used to estimate the biodiesel blend ratio.

As disclosed in U.S. Ser. No. 12/850,112, utilizing model-based burned fraction dynamics, burned fraction dynamics at the intake ($\dot{F}_i$) and burned fraction dynamics at the exhaust ($\dot{F}_x$) can be expressed as follows:

$$\dot{F}_i = \frac{1}{m_i}(W_{egr}(F_x - F_i) - W_c F_i) \quad [19]$$

$$\dot{F}_x = \frac{1}{m_i}(W_{e,in} F_i - W_{e,out} F_x + (1 + AFR_s)W_f) \quad [20]$$

wherein $\dot{F}_i$ and $\dot{F}_x$ indicate dynamic intake and exhaust gas mass burned fractions, respectively;

$F_i$ is the intake gas mass burned fraction;

$F_x$ is the exhaust gas mass burned fraction;

$AFR_s$ is stoichiometric air/fuel ratio of the engine fuel in the cylinder charge;

$W_{egr}$ is mass of exhaust gas flow through the EGR system into the intake manifold;

$W_c$ is mass of fresh air flow into the intake manifold 14; and $W_f$ is the injected fuel mass in the cylinder charge.

At steady state, based upon a known air fuel ratio value, AFR, an exhaust oxygen fraction for B0 fuel, $O_{2x}$, can be estimated as follows.

$$O_{2x} = 0.23 \cdot (1 - F_x) = 0.23\left(\frac{AFR - AFR_{stRD}}{1 + AFR}\right) \quad [21]$$

$O_{2x}$ can be expressed as follows.

$$O_{2x} = f_{B0}(AFR) \quad [22]$$

$O_{2x}$ is determinable, for example, according to the exhaust oxygen fraction to air fuel ratio relationship illustrated in FIG. 4. A similar expression can for a relationship between $O_2$ and $AFR_{stBD}$ is as follows.

$$O_2 = 0.23 \cdot (1 - F_x) = 0.23\left(\frac{AFR - AFR_{stBD}}{1 + AFR}\right) \quad [23]$$

By solving for $AFR_{stBD}$, a biodiesel blend ratio can be determined according to the present disclosure.

According to the present disclosure, $O_{2x}$ and $O_2$ can be used to estimate and provide control based upon the biodiesel blend ratio. However, during operation of the engine, $O_{2x}$ and $O_2$ can include significant variability. According to one embodiment, state space modeling and a Kalman filter can be utilized to estimate a biodiesel blend ratio for fuel being utilized by an engine based upon $O_{2x}$ and $O_2$ values, removing variability and producing a stable value useful for control. According to one embodiment, state space modeling and a Kalman filter can be utilized to estimate a biodiesel blend ratio for fuel being utilized by an engine based upon $O_{2x}$ and $O_2$. A gamma ratio can be defined as follows.

$$r(t) = O_2 - O_{2x} = O_2 - f_{B0}(AFR) \quad [24]$$

$$r(t) = 0.23\left(\frac{AFR_{stBD} - AFR_{stRD}}{1 + AFR}\right) \quad [25]$$

Where $AFR_{stBD}$ is an unknown value to be estimated, a state space model can be defined by the following.

$$x_{k+1} = x_k + w_k, x_0 = 0 \quad [26]$$

$$y_k = H_k x_k + v_k \quad [27]$$

$$y_k = r(t), H_k = \frac{0.23}{1 + AFR} \quad [28]$$

$$x_k = AFR_{stBD} - AFR_{stRD} \quad [29]$$

A Kalman filter as defined by Eqs. 13-15 can similarly be utilized, providing an $\hat{x}_{k|k}$ estimate value for $AFR_{stBD} - AFR_{stRD}$. Predicted estimate covariance as defined by Eq. 16 can similarly be utilized. One having skill in the art will appreciate that other filters can be used in the alternative to the Kalman filter. The biodiesel blend ratio for the fuel being utilized by the engine can be estimated as follows.

$$BD = \frac{AFR_{stBD} - AFR_{stRD}}{AFR_{stB100} - AFR_{stRD}} \cdot 100\% \quad [30]$$

Figure 5:
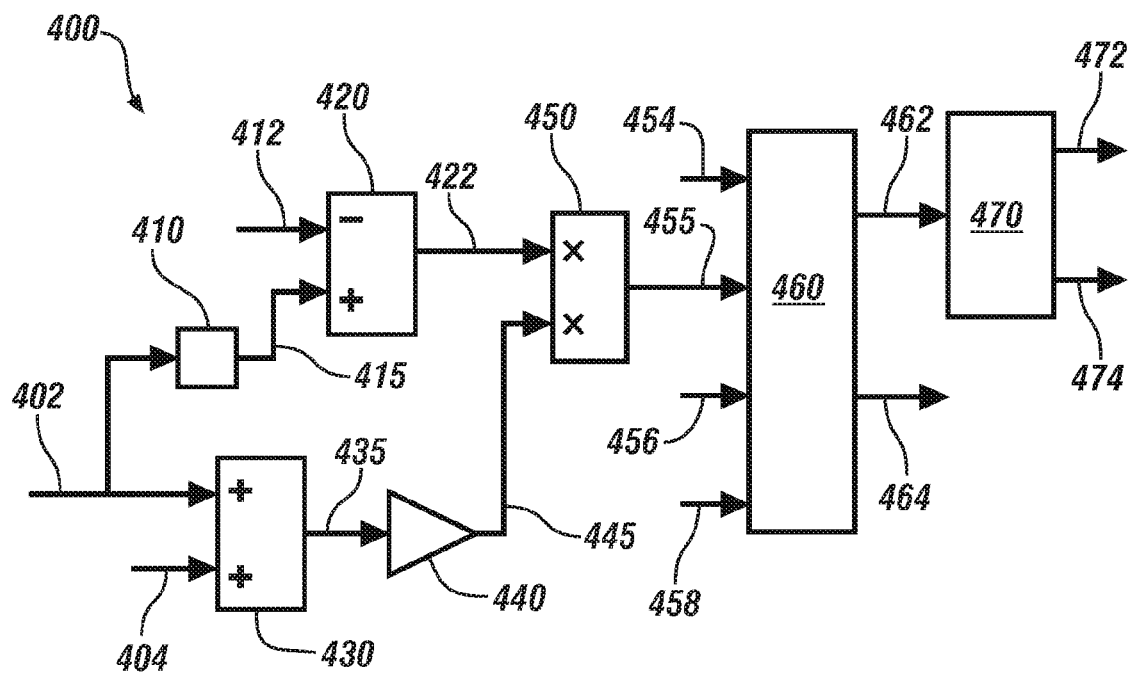
FIG. 5 illustrates an exemplary information flow to utilize state space modeling and a Kalman filter to estimate a biodiesel blend ratio for fuel being utilized by an engine, in accordance with the present disclosure.

FIG. 5 illustrates an exemplary information flow to utilize state space modeling and a Kalman filter to estimate a biodiesel blend ratio for fuel being utilized by an engine based upon $O_2$ and $O_{2x}$. Information flow 400 begins with combustion property module 410 which monitors an AFR signal 402 and determines $O_{2x}$ 415. Disparity module 420 monitors $O_{2x}$ 415 and an actual or estimated $O_2$ value 412 and generates disparity signal 422. Summation module 430 monitors AFR value 402 and value one signal 404 and determines signal 435. Gain module 440 multiplies signal 435 by a fixed value (including an exemplary value of 4.34) and determines signal 445. Gamma ratio module 450 monitors disparity signal 422 and signal 445, and outputs gamma ratio r(t) 455. Information flow 400 can use a single filter or a plurality of filters. Information flow 400 includes Kalman filter 460. Kalman filter 460 monitors r(t) 455, noise term $Q_{k-1}$ 454, value $H_k$ 456 (including an exemplary value of $$\frac{0.23}{1 + AFR}),$$

and noise term $R_k$ 458. Noise terms 454 and 458 can be fixed values. In another embodiment, each of the noise terms can include a plurality of selectable filter constant values that can be switched between, providing selectable wide band and narrow band filtering based upon desired operation of the filter. Such selection can enable rapid adjustment of the filter to a changed value, and subsequent switching to a slower but more stable response. Exemplary values of $Q_{k-1}$ include 0.1 and 0.01, and exemplary values of $R_k$ include 500 and one. Kalman filter 460 determines and outputs value $\hat{x}_{k|k}$ 462 and predicted estimated covariance value 464. Output module 470 monitors $\hat{x}_{k|k}$ value 462 to determine $AFR_{stBD}$ signal 472 and $AFR_{stBD}/AFR_{stRD}$ signal 474, the determinations enabled through equations provided herein. Output modules 470 can include mechanisms to lock in values of the respective outputs when criteria are met that the respective output value represents a stable and accurate estimate. Information flow 400 illustrates one exemplary configuration, however the disclosure is not intended to be limited to the particular exemplary embodiments provided herein.

Determining a value for the biodiesel blend ratio according to the present disclosure can include correlating an air fuel ratio to an exhaust oxygen fraction. This correlation and the estimations enabled are most accurate when the engine is operating under steady state or semi-steady state conditions. Further, the correlation and the estimations enabled are most accurate when the air fuel ratio for the engine is between 18 and 40. According to one embodiment, determination of the biodiesel blend ratio does not need to be performed continuously. Once a fuel tank is filled, mixed thoroughly, and fuel has been drawn from the tank through the fuel system, the composition of the fuel is unlikely to change, resulting in a substantially constant biodiesel blend ratio until the next filling event. According to one embodiment, the control module performing the determination of the biodiesel blend ratio can wait to trigger the determination until the engine reaches a steady or semi-state state condition and the air fuel ratio is within the permitted range. Examples of steady or semi-steady state conditions include operation at idle when vehicle speed is less than 3 miles per hour and operation under cruise control. According to another embodiment, conditions permitting the determination of the biodiesel blend ratio can be forced. For example, if the air fuel ratio of the engine is outside of the 18 to 40 range, either retarding injection timing or manipulation of the air throttle can temporarily change the air fuel ratio of the engine to permit determination of the ratio while maintaining the requested output torque.

Once determined, the biodiesel blend ratio can be used to control the engine, correcting fuel injection amounts based upon the particular fuel composition being injected. Fuel can also be used in other systems within a vehicle, for example, within a lean NOx trap device in an exhaust aftertreatment system, enabling the lean NOx trap to regenerate. The biodiesel blend ratio can be used to correct an amount of fuel delivered to the device, tuning the operation of the engine to create a correct exhaust gas flow composition for regeneration.

Monitoring and estimating of combustion properties can be used during a period of time or phase to estimate a biodiesel blend ratio. Such a period of time can be termed a biodiesel blend ratio detection phase or a detection phase. The detection phase is most useful when the fuel tank has been refilled, adjusting operation of the engine based upon a potentially new fuel composition in the fuel tank. The detection phase can last a period of time sufficient for the fuel mixture being injected into the engine to reach a steady state composition and for one of the methods disclosed herein to determine an accurate estimate. In one embodiment, selection of a filter constant utilized in the estimation of the biodiesel blend ratio can affect the time required to reach an accurate estimate. After the detection phase, wherein fuel composition in the fuel tank is substantially constant, a method employing the inputs utilized to estimate the biodiesel blend ratio can instead monitor and correct sensor readings in an error correction phase. In one embodiment, a method to correct a MAF sensor error or a fuel injection error can be employed in a MAF error correction phase. An exemplary MAF error correction phase can last a period of time sufficient to accurately correct the MAF sensor error. In one embodiment, the MAF error correction phase operates whenever the detection phase is not active.

Figure 6:
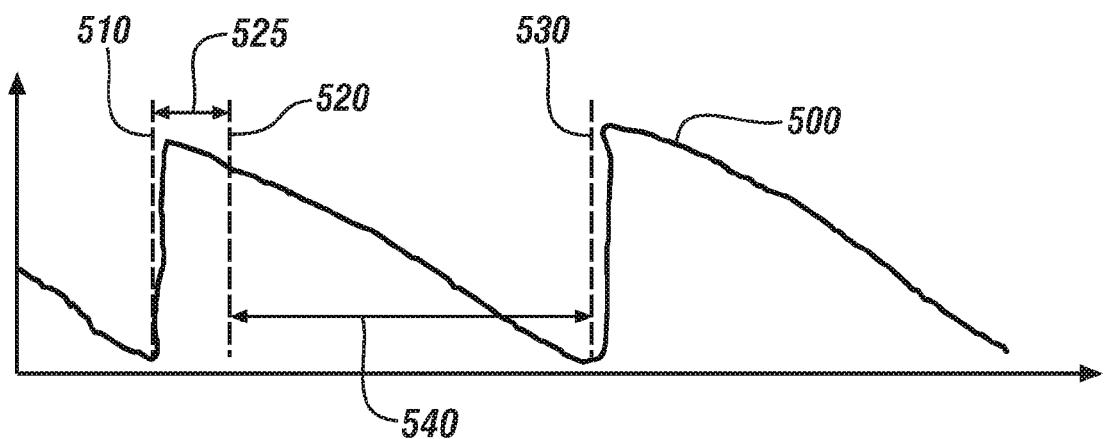
FIG. 6 illustrates fuel level in a fuel tank through plurality of fill events and a corresponding detection phase and a mass air flow error correction phase, in accordance with the present disclosure.

FIG. 6 illustrates fuel level in a fuel tank through plurality of fill events and a corresponding detection phase and a MAF error correction phase. A horizontal x-axis illustrates time. A vertical y-axis illustrates fuel level in the fuel tank. Plot 500 illustrates fuel level. Periods of time wherein the fuel level gradually decreases are illustrated, each followed by sharp increases in the fuel level corresponding to a fill event. A start of a first fill event 510 is illustrated. As disclosed herein, a detection phase 525 can be initiated with a fill event, as the potential for a new fuel composition in the fuel tank is high. Detection phase 525 runs for a period, satisfying requirements to accurately estimate the biodiesel blend ratio of the fuel in the fuel tank. At time 520, the detection phase is ended, and a MAF error correction phase 540 is initiated. MAF error correction phase 540 continues until a start of a second fill event 530 is detected. At the start of the second fill event 530, a new detection phase can be operated, and the cycle can repeat for every fill event.

Operation of a MAF error correction phase can be operated every time a detection phase ends or can be operated frequently. In one embodiment, operation of a MAF error correction phase is performed when there is a high confidence in the values available to the system. For example, when the biodiesel blend ratio estimate indicates that the fuel being utilized by the engine is B0 fuel, the input from the exhaust oxygen fraction sensor can be assumed to be accurate. A resulting $AFR_{est}$ value can therefore be assumed to be an actual air fuel ratio for the engine. By comparing the $AFR_{est}$ value to a monitored AFR value, an error in the monitored AFR value can be evaluated and used to correct a MAF sensor error.

Correcting a MAF sensor error based upon an estimated $AFR_{stBD}$ value can be accomplished according to the following:

$$0 = O_2 - 0.23\left(1 - \frac{AFR_{stBD\_estimated} \cdot F_x}{MAF_c}\right) \quad [31]$$

$$MAF_c = \frac{AFR_{stBD\_estimated}}{1 - 4.76 O_2} \cdot F_x \quad [32]$$

wherein $AFR_{stBD\_estimated}$ is a value for $AFR_{stBD}$ determined in a detection phase since the most recent fill event; and $MAF_c$ is a corrected MAF sensor value.

$MAF_c$ can be validated before the MAF sensor reading is corrected according to $MAF_c$. One method to validate $MAF_c$ is to determine whether either the difference between $MAF_c$ and MAF, $\Delta$MAF, or a ratio between $MAF_c$ and MAF, rMAF, is stable.

Figure 7:
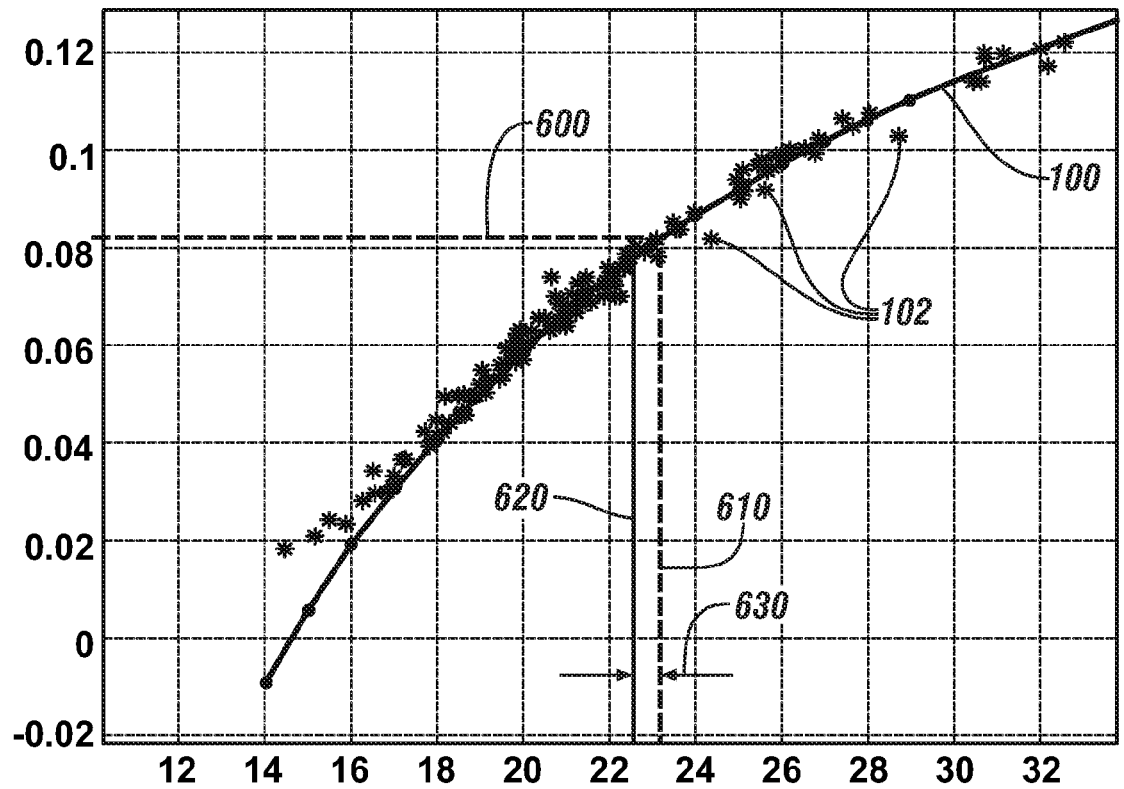
FIG. 7 illustrates an exhaust oxygen fraction to air fuel ratio relationship useful to correcting a mass air flow sensor for a vehicle determined to be utilizing fuel composed entirely of B0 or diesel fuel, in accordance with the present disclosure.

Alternatively, correcting fuel injection and MAF sensor readings can be performed based upon a comparison of AFR and $AFR_{est}$. One method can be utilized in new vehicles wherein certain assumptions can be made, for example, that an exhaust oxygen sensor provides an accurate reading. Under such conditions, if $|AFR-AFR_{est}|<3\%$, then a final fuel pulse width can be corrected such that $AFR=AFR_{est}$. If $|AFR-AFR_{est}|>3\%$ and either $(AFR-AFR_{est})*fuelrate$, a measure of MAF sensor additive error, or $AFR_{est}/AFR$, a measure of MAF sensor gain error, is constant, then the MAF sensor can be assumed to have either a constant additive or multiplicative error. FIG. 7 illustrates an exhaust oxygen fraction to air fuel ratio relationship useful to correcting a MAF sensor for a vehicle determined to be utilizing fuel composed entirely of B0 or diesel fuel. A horizontal x-axis illustrates an air fuel ratio. A vertical y-axis illustrates an exhaust oxygen fraction. Plot 100 illustrates combustion properties of B0 fuel. Plot 100 can be generated by selecting a best fit of experimental points 102 monitored during testing of an exemplary engine configuration. An actual exhaust oxygen fraction value 600 is utilized with plot 100 to determine an $AFR_{est}$ value 610, estimating an air fuel ratio based upon the combustion properties of B0 fuel. Additionally, an actual AFR value 620 is monitored or estimated. Because confidence in the oxygen sensor and fuel type is high, and based upon a reliable AFR value, a discrepancy 630 between AFR value 620 and $AFR_{est}$ value 610 can be attributed to error in the MAF sensor used to control intake air to the engine. Therefore, discrepancy 630 can be used to adjust MAF sensor readings.

In another method in higher mileage vehicles, if $$\left|AFR - AFR_{est}\frac{1}{\hat{x}_{k|k}(D)}\right| < 3\%$$

or another calibrated value, then a final fuel pulse width can be corrected such that $$AFR = AFR_{est}\left(\frac{1}{\hat{x}_{k|k}(D)}\right).$$

If $$\left|AFR - AFR_{est}\left(\frac{1}{\hat{x}_{k|k}(D)}\right)\right| > 3\%$$

and either $$\left(AFR - AFR_{est}\left(\frac{1}{\hat{x}_{k|k}(D)}\right)\right)*fuelrate,$$

a measure of MAF sensor additive error, or $$AFR_{est}\bigg/\left(AFR\left(\frac{1}{\hat{x}_{k|k}(D)}\right)\right),$$

a measure of MAF sensor gain error, is constant, then the MAF sensor can be assumed to have either a constant additive or multiplicative error. The MAF sensor reading can be corrected such that $$AFR = AFR_{est}\left(\frac{1}{\hat{x}_{k|k}(D)}\right).$$

If $$\left| AFR - AFR_{est}\left(\frac{1}{\hat{x}_{k|k}(D)}\right) \right| > 20\%$$

or another calibrated value, then a MAF sensor malfunction can be diagnosed and an appropriate error message generated.

Figure 8:
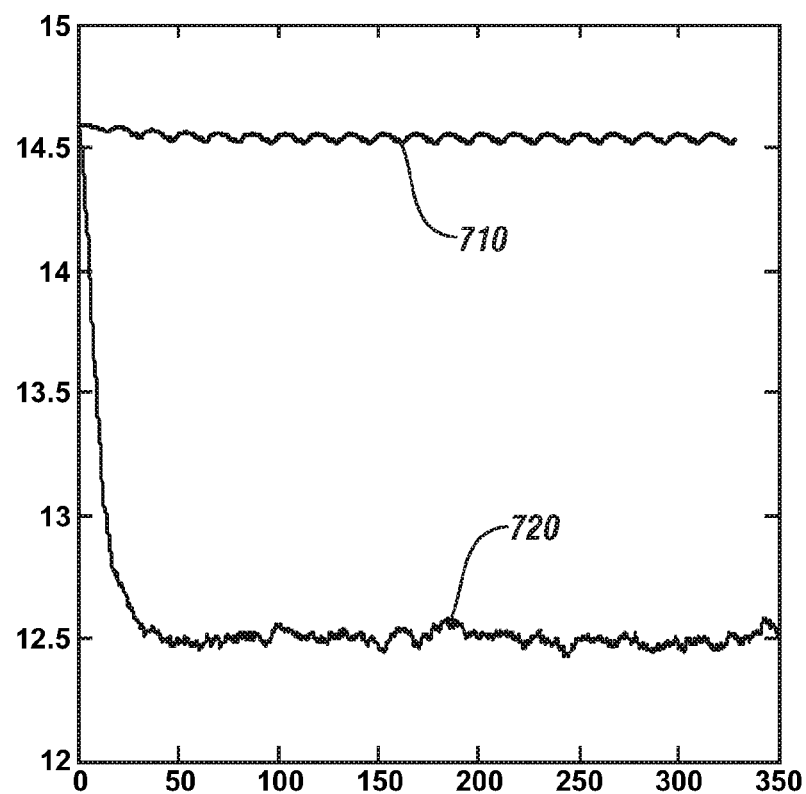
FIG. 8 illustrates results of air fuel ratio estimation, in accordance with the present disclosure.

FIG. 8 illustrates results of air fuel ratio estimation. A horizontal x-axis illustrates time in seconds. A vertical y-axis illustrates an air fuel ratio value. The illustrated values show estimated $AFR_{stBD}$ values for an engine operated through a time period. Plot 710 illustrates an air fuel ratio estimation for the engine operated with B0 fuel. Due to the filter selected for the estimation, plot 710 illustrates values cyclically varying around a value. The exemplary plot includes an initial value close to the steady state estimation. Plot 720 illustrates an air fuel ratio estimation for the engine operated with B100 fuel. The exemplary plot includes an initial value distant from the steady state and convergence of plot 720 from the initial value to the steady state estimation. Due to the filter selected for the estimation, plot 720 illustrates a relatively slow convergence taking approximately 50 seconds from the initial value to the steady state estimation and signal noise through the steady state estimation.

Figure 9:
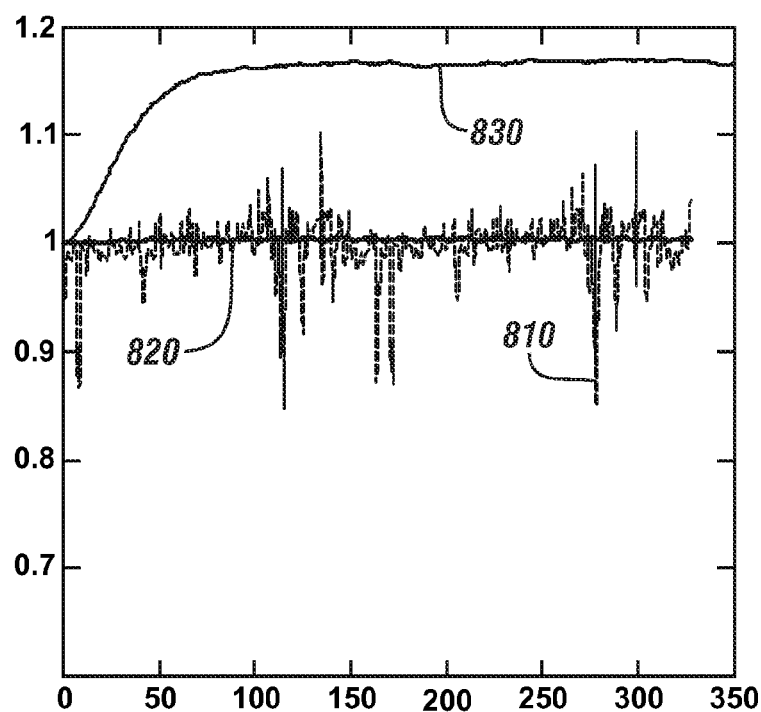
FIG. 9 illustrates results of estimation of a ratio of an air fuel ratio for B0 fuel at stoichiometry to an air fuel ratio for a fuel composition including biodiesel fuel at stoichiometry, in accordance with the present disclosure.

FIG. 9 illustrates results of estimation of a ratio of an air fuel ratio for B0 fuel at stoichiometry to an air fuel ratio for a fuel composition including biodiesel fuel at stroichiometry. A horizontal x-axis illustrates time in seconds. A vertical y-axis illustrates an air fuel ratio value. The fuel composition including biodiesel utilized for the plot is B100 fuel. Plot 810 illustrates monitored values for a gamma ratio r(t) utilized in the determination of plot 820. Plot 820 illustrates estimation of $AFR_{stRD}/AFR_{stBD}$ for an engine utilizing B0 fuel. Because the estimation of $AFR_{stBD}$ is based upon an engine utilizing B0 fuel, the ratio of $AFR_{stRD}/AFR_{stBD}$ substantially equals one. Plot 830 illustrates estimation of $AFR_{stRD}/AFR_{stBD}$ for an engine utilizing B100 fuel, including convergence from an initial value to a steady state estimation.

Figure 10:
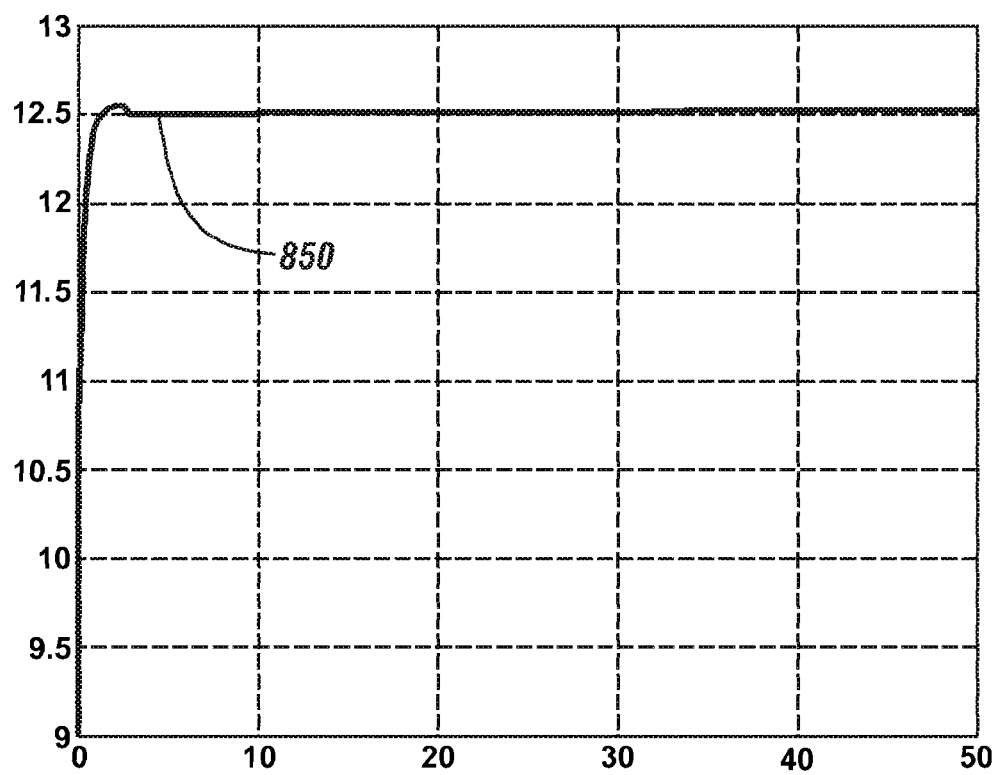
FIG. 10 illustrates results of air fuel ratio estimation including use of a filter resulting in a relatively fast convergence, in accordance with the present disclosure.

FIG. 10 illustrates results of air fuel ratio estimation including use of a filter resulting in a relatively fast convergence. A horizontal x-axis illustrates time in seconds. A vertical y-axis illustrates an air fuel ratio value. Plot 850 illustrates $AFR_{stBD}$ estimation for an engine utilizing B100 fuel. Due to filter selection, a relatively fast convergence taking approximately one second from the initial value to the steady state estimation is illustrated. Further, plot 850 illustrates a steady state estimation including only small variance. One having skill in the art will appreciate that selection of such a filter, reducing convergence time, will frequently result in substantial signal noise variation in the steady state estimation. Further, selection of a filter that reduces signal noise variation in the steady state estimation will frequently include a long convergence from the initial value to the steady state estimation. However, as disclosed in relation to FIGS. 3 and 5, a control module estimating an air fuel ratio can be configured to select between filter values. Plot 850 illustrates results that can be achieved based upon utilizing a first filter enabling a rapid convergence and a second filter enabling steady state estimation with low variance.

Figure 11:
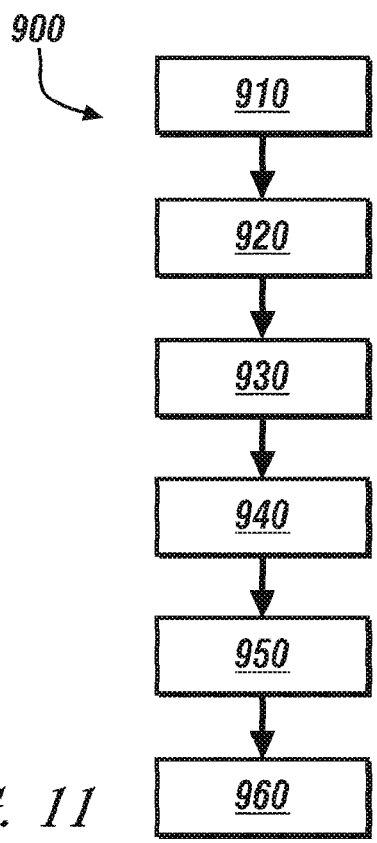
FIG. 11 illustrates an exemplary process to estimate a biodiesel blend ratio, in accordance with the present disclosure.

FIG. 11 illustrates an exemplary process to estimate a biodiesel blend ratio. Table 1 is provided as a key wherein the numerically labeled blocks and the corresponding functions are set forth as follows.

TABLE 1

| BLOCK | BLOCK CONTENTS |
|---|---|
| 910 | Monitoring a First Combustion Parameter |
| 920 | Correlate the Monitored First Combustion Parameter to a Second Combustion Parameter for an Engine Operating Solely on Diesel Fuel by Referencing an Exhaust Oxygen Fraction to Air Fuel Ratio Relationship |
| 930 | Monitor an Actual Value for the Second Combustion Parameter |
| 940 | Compare the Second Combustion Parameter for the Engine Operating Solely on Diesel Fuel and the Actual Value for the Second Combustion Parameter |
| 950 | Determine a Biodiesel Blend Ratio for Fuel Being Utilized by the Engine Based upon the Comparing |
| 960 | Control the Engine Based upon the Biodiesel Blend Ratio |

Process 900 begins at block 910 wherein a first combustion parameter is monitored. The first combustion parameter can be one of an exhaust oxygen fraction and an air fuel ratio. At block 920, a second combustion parameter is determined based upon correlating the first combustion parameter through a known exhaust oxygen fraction to air fuel ratio relationship, the second combustion parameter being determined for an exemplary engine utilizing solely diesel fuel. Block 920 provides the remaining term of the exhaust oxygen fraction and the air fuel ratio not utilized as the first combustion parameter. At block 930, an actual value of the second combustion parameter is monitored. At block 940, the second combustion parameter for the engine utilizing solely diesel fuel is compared to the actual value for the second combustion parameter. At block 950, a biodiesel blend ratio is determined based upon the comparing. At block 960, the engine is controlled based upon the biodiesel blend ratio.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method to control an internal combustion engine fueled by a variable fuel blend of a first fuel and a second fuel, the method comprising:
    operating the engine with a variable fuel blend of a first fuel and a second fuel, said variable fuel blend comprising an unknown ratio of a first portion of the first fuel and a second remaining portion of the second fuel;
    monitoring a value of a first combustion parameter during engine operation;
    monitoring a first value for a second combustion parameter during engine operation, wherein the first combustion parameter comprises one of an air fuel ratio and an exhaust oxygen fraction and the second combustion parameter comprises the other one of the air fuel ratio and the exhaust oxygen fraction;
    determining a second value for the second combustion parameter in accordance with a predetermined correspondence among said first combustion parameter, said second combustion parameter, and a predetermined fuel blend of the first fuel and the second fuel;
    only when the monitored air fuel ratio is within a predetermined range, determining the ratio of the variable fuel blend based upon a difference between the first and second values for the second combustion parameter; and
    controlling the engine based upon the fuel blend.

2. The method of claim 1, wherein said first combustion parameter comprises the exhaust oxygen fraction and said second combustion parameter comprises the air fuel ratio.

3. The method of claim 1, wherein said first combustion parameter comprises the air fuel ratio and said second combustion parameter comprises the exhaust oxygen fraction.

4. The method of claim 1, wherein said predetermined fuel blend comprises 100 percent of said first fuel and 0% of said second fuel.

5. The method of claim 1, wherein said predetermined fuel blend comprises 100 percent of said second fuel and 0% of said first fuel.

6. The method of claim 1, wherein determining said second value for the second combustion parameter comprises referencing said second value from a predetermined look-up table correlating values of said first combustion parameter and said second combustion parameter at said predetermined fuel blend.

7. The method of claim 1, wherein determining said second value for the second combustion parameter comprises solving a predetermined equation representing the correspondence between said first combustion parameter and said second combustion parameter.

8. Method to control an internal combustion engine fueled by a variable fuel blend of a diesel fuel and a biodiesel fuel, the method comprising:
    operating the engine with a variable fuel blend of a diesel fuel and a biodiesel fuel, said variable fuel blend comprising an unknown ratio of a first portion of the diesel fuel and a second remaining portion of the biodiesel fuel;
    monitoring a value of a first combustion parameter during engine operation;
    monitoring a first value for a second combustion parameter during engine operation; wherein the first combustion parameter comprises one of an air fuel ratio and an exhaust oxygen fraction and the second combustion parameter comprises the other one of the air fuel ratio and the exhaust oxygen fraction;
    determining a second value for the second combustion parameter in accordance with a predetermined correspondence among said first combustion parameter, said second combustion parameter, and a predetermined fuel blend of the diesel fuel and the biodiesel fuel;
    only when the monitored air fuel ratio is within a predetermined range, determining the ratio of the variable fuel blend based upon the first and second values for the second combustion parameter; and
    controlling the engine based upon the fuel blend.

9. The method of claim 8, wherein said first combustion parameter comprises the exhaust oxygen fraction and said second combustion parameter comprises the air fuel ratio.

10. The method of claim 9, wherein said predetermined fuel blend comprises 100 percent diesel fuel and 0% biodiesel fuel, and wherein determining the ratio of the variable fuel blend comprises determining a percentage of biodiesel fuel of the fuel blend in accordance with the following equation:

$$BD = \frac{\frac{AFR_{stBD}}{AFR_{stRD}} - 1}{\frac{AFR_{stB100}}{AFR_{stRD}} - 1} \cdot 100\%$$

wherein
    BD equals the percentage of biodiesel fuel of the fuel blend;
    $AFR_{stBD}$ equals the stoichiometric air fuel ratio for the fuel blend;
    $AFR_{stRD}$ equals the stoichiometric air fuel ratio for diesel fuel; and
    $AFR_{stB100}$ equals the stoichiometric air fuel ratio for biodiesel fuel.

11. The method of claim 9, wherein determining the ratio of the variable fuel blend comprises utilizing a state space model and a Kalman filter to determine the fuel blend.

12. The method of claim 11, wherein the state space model comprises a gamma ratio utilizing the following equation:

$$r(t) = \frac{(1 + AFR_{est})}{(1 + AFR)}$$

wherein
    r(t) equals the gamma ratio;
    AFR equals the first value of the air fuel ratio; and
    $AFR_{est}$ equals the second value of the air fuel ratio.

13. The method of claim 8, wherein said first combustion parameter comprises the air fuel ratio and said second combustion parameter comprises the exhaust oxygen fraction.

14. The method of claim 13, wherein said predetermined fuel blend comprises 100 percent diesel fuel and 0% biodiesel fuel, and wherein determining the fuel blend comprises determining a percentage of biodiesel fuel of the fuel blend in accordance with the following equation:

$$BD = \frac{AFR_{stBD} - AFR_{stRD}}{AFR_{stB100} - AFR_{stRD}} \cdot 100\%$$

wherein
    BD equals the percentage of biodiesel fuel of the fuel blend;
    $AFR_{stBD}$ equals the stoichiometric air fuel ratio for the fuel blend;
    $AFR_{stRD}$ equals the stoichiometric air fuel ratio for diesel fuel; and
    $AFR_{stB100}$ equals the stoichiometric air fuel ratio for biodiesel fuel.

15. The method of claim 13, wherein determining the ratio of the variable fuel blend comprises utilizing a state space model and a Kalman filter to determine the fuel blend.

16. The method of claim 15, wherein the state space model comprises a gamma ratio utilizing the following equation:

$$r(t) = 0.23\left(\frac{AFR_{stBD} - AFR_{stRD}}{1 + AFR}\right)$$

wherein
    r(t) equals the gamma ratio;
    $AFR_{stBD}$ equals the stoichiometric air fuel ratio for the fuel blend;
    $AFR_{stRD}$ equals the stoichiometric air fuel ratio for diesel fuel; and
    AFR equals the first value of the air fuel ratio.

17. The method of claim 8, wherein the method is performed subsequent to fuel fill event wherein a fuel level within a fuel tank increases.

18. The method of claim 17, further comprising:
correcting a MAF sensor error subsequent to a delay after the fuel fill event sufficient for the fuel blend to reach a steady state composition.

19. The method of claim 17, further comprising:
correcting a fuel injection pulse width subsequent to a delay after the fuel fill event sufficient for the variable fuel blend to reach a steady state composition.

20. Method to control an internal combustion engine fueled by a variable fuel blend of a diesel fuel and a biodiesel fuel, the method comprising:
operating the engine with a variable fuel blend of a diesel fuel and a biodiesel fuel, said variable fuel blend comprising an unknown first portion of the first fuel and a second remaining portion of the second fuel;
monitoring a value of exhaust oxygen fraction during engine operation;
monitoring a first value for air fuel ratio during engine operation;
referencing a second value for air fuel ratio from a predetermined look-up table correlating values of exhaust oxygen fraction and air fuel ratio at a fuel blend of 100 percent diesel fuel and 0% biodiesel fuel;
only when the monitored air fuel ratio is within a predetermined range, determining the variable fuel blend based upon the first and second values for air fuel ratio; and
controlling the engine based upon the fuel blend.

\* \* \* \* \*